United States Patent Office 3,338,676
Patented Aug. 29, 1967

3,338,676
PREPARATION OF A TITANIA HYDRATE
Leif Aagaard, Warren Township, Plainfield, N.J., assignor to National Lead Company, New York, N.Y., a corporation of New Jersey
No Drawing. Filed Oct. 28, 1964, Ser. No. 407,235
3 Claims. (Cl. 23—202)

ABSTRACT OF THE DISCLOSURE

This invention covers a process for producing a titania yield seed from a titanium sulfate-ferrous sulfate solution by admixing said solution with a saturated solution of potassium sulfate and forming a double precipitate of titanium and potassium sulfate, removing the soluble iron values from the precipitate and heating the precipitate at a temperature from 50° C. to 95° C. to solubilize the potassium sulfate and hydrolyze the titania values.

This application is a continuation-in-part of my application Ser. No. 335,670, filed Jan. 3, 1964, now abandoned, which is assigned to the same assignee as the instant application.

Although many methods have been described in the prior art for making yield seeds of various kinds, most suffer from the disadvantage that they require the titanium values to be neutralized or subjected to alkaline treatments, then reacidified for use in the hydrolysis process. Such processes are complex and expensive and therefore are employed with economical limitations in commercial operations.

An object of the instant invention therefore is to provide a process which produces a yield seed from a titanium solution which does not require a neutralizing or alkalizing step followed by reacidification to produce a yield seed. Another object is to provide a process for preparing a yield seed from a titanium sulfate solution containing iron sulfate wherein the iron values are readily removed from the titanium values. A further object is to provide a process for preparing a high quality titania yield seed by a simple and economical process which does not require alkalizing or acidifying agents. These and other objects will become apparent from the following and more complete description of the instant invention.

Broadly the instant invention contemplates a process for producing a titania yield seed from a titanium sulfate-ferrous sulfate solution which comprises:

(1) Admixing said titanium sulfate-ferrous sulfate solution and an aqueous slurry of potassium sulfate to form and precipitate a titanium-potassium-sulfate double salt composition, said reaction being carried out under agitation at a temperature from 10° C. to 50° C., the amounts of the titanium sulfate-ferrous sulfate solution and the potassium sulfate employed being from 0.7 to 3.0 moles of potassium sulfate per mole of titanium sulfate;
(2) Filtering said double salt;
(3) Washing said double salt with a saturated solution of $K_2SO_4$ to remove the soluble ferrous sulfate and other impurities from said double salt;
(4) Slurrying the washed double salt in an aqueous media and,
(5) Heating said slurry with stirring to a temperature from 50° C. to no more than 95° C. to hydrolyze the titanium values as a titania hydrate.

The titanium sulfate-ferrous sulfate solution employed in the process of the instant invention may be prepared by a variety of well known methods. The most common source is the solution obtained from the digestion of a titaniferous iron ore, concentrate or slag with concentrated sulfuric acid. In such a process the ore, concentrate or slag is reacted at high temperature with concentrated sulfuric acid to form a "digestion cake" which is dissolved in aqueous media. The solubilized iron sulfate values in the titanium solution are reduced with scrap metal to ferrous sulfate and the solution is clarified to produce the titanium sulfate-ferrous sulfate solution.

This solution is then admixed with an aqueous slurry of potassium sulfate with agitation to form the double salt composition. The amounts of the titanium sulfate-ferrous sulfate solution and potassium sulfate employed is from 0.7 to 3.0 moles of potassium sulfate for each mole of titanium sulfate.

The reaction should be carried out at a temperature from 10° C. to 50° C. and preferably at room temperature.

The titanium sulfate-ferrous sulfate solution preferably should contain from 20 to 300 g.p.l. titanium, calculated as $TiO_2$, and the solution preferably should also have a $H_2SO_4/TiO_2$ mole ratio of from 1.0 to 3.0.

The amount of titanium sulfate-ferrous sulfate solution employed with respect to the total volume of liquid present is such that at the end of the reaction the $TiO_2$ is from 15 to 200 g.p.l. titanium, calculated as $TiO_2$.

The reaction between the titanium sulfate-ferrous sulfate solution and the potassium sulfate slurry takes place rapidly and the double salt formation is completed in the matter of a few minutes.

The double salt precipitate is filtered and washed thoroughly with a saturated solution of $K_2SO_4$. The ferrous sulfate values remain in solution during the filtering and washing steps so that a substantially iron-free double salt product is obtained.

In preparing a yield seed from the double salt precipitate, the washed precipitate is slurried in an aqueous medium, i.e. water, weak sulfuric acid or a saturated solution of $K_2SO_4$, and the slurry is heated with stirring to a temperature from 50° C. to no more than 95° C. whereby the titanium values in the double salt are converted to a precipitate of titania hydrate. The conversion of the double salt to titania hydrate should take place between 50° C. and 95° C. since the hydrate loses its properties as a yield seed when heated above 95° C. The titania hydrate formed at a temperature between 50° C. and 95° C. is then filtered and washed with water to remove the $K_2SO_4$ solution if desired.

The titania hydrate so formed when added to the hydrolysis step in the production of $TiO_2$ pigment acts as an excellent yield seed in the recovery of the titanium values from solution.

In order to more fully illustrate the instant invention the following examples are presented:

Example 1

A titaniferous iron ore was digested with concentrated sulfuric acid to form a "digestion cake" which was dissolved in weak acid. Scrap iron was added during the dissolving step in order to reduce the ferric iron values to ferrous sulfate. The solution was clarified and crystallized to remove the bulk of the ferrous sulfate values. The clarified and crystallized solution had the following analysis:

| | |
|---|---|
| $TiO_2$ | g.p.l__ 174 |
| $H_2SO_4$ | g.p.l__ 328 |
| Fe | g.p.l 44 |
| $H_2SO_4/TiO_2$ (mole ratio) | 154 |

One hundred milliliters of the above solution containing 17.4 grams of $TiO_2$ were added with stirring at room temperature over a period of 2 minutes to 100 milliliters of water containing 80 grams of $K_2SO_4$. A double salt precipitate formed immediately.

After the addition, the mixture was stirred for 15 minutes at room temperature and then the precipitated double salt was deliquored, filtered and washed with 1 liter of water saturated with $K_2SO_4$.

In order to prepare a yield seed from the double salt, the washed precipitate was then slurried in 500 ml. of water saturated with $K_2SO_4$. The slurry contained 27.5 g.p.l. $TiO_2$, 18 g.p.l. $H_2SO_4$ with an $H_2SO_4/TiO_2$ mole ratio of 0.53.

This slurry was then heated to 85° C. in 10 minutes and held at 85° C. for 10 minutes in order to convert the double salt into a titania hydrate. 100% of the titanium values were hydrolyzed in this manner. The titania hydrate formed was then deliquored and washed with 500 milliliters of water to remove the $K_2SO_4$ values.

In order to show the effectiveness of the yield seed produced, 15 grams of the yield seed prepared above (calculated on the calcined $TiO_2$ basis) were added at room temperature to 3 liters of a titanium sulfate-iron sulfate solution containing 522 g. of titanium sulfate calculated as $TiO_2$, and upon boiling the seeded solution for one hour, a recovery of 96% of the titanium values was obtained during hydrolysis.

It should be noted that the yield seed produced by the process of the instant invention was formed without using alkalizing agents and without employing boiling temperatures.

*Examples 2–8*

Using the same procedure as that described in Example 1 a series of runs were made in which the amounts of water and $K_2SO_4$ were varied and different titanium sulfate-ferrous sulfate solutions were employed. The operational details of these runs are recorded in the following table along with the data of Example 1. In all cases the double salt produced was similar in composition to that described in Example 1, and good yield seeds were obtained from all of these double salts when processed according to the procedure described in Example 1.

TABLE

| Analysis Titanium Solution Used | Example Number | | | | | | | |
|---|---|---|---|---|---|---|---|---|
| | 1 | 2 | 3 | 4 | 5 | 6 | 7 | 8 |
| $TiO_2$, g.p.l. | 174 | 181 | 181 | 181 | 50 | 242 | 184 | 184 |
| $H_2SO_4$, g.p.l. | 328 | 362 | 362 | 362 | 100 | 487 | 368 | 356 |
| Fe, g.p.l. | 44 | 47 | 47 | 47 | 13 | 65 | 39 | 50 |
| $H_2SO_4/TiO_2$ (mole ratio) | 1.54 | 1.63 | 1.63 | 1.63 | 1.63 | 1.63 | 1.63 | 1.58 |
| Amt. of Titanium Solution Used, ml | 100 | 100 | 100 | 100 | 340 | 70 | 100 | 100 |
| Amt. of Water Used, ml | 100 | 500 | 1,000 | 50 | 100 | 130 | None | None |
| Amt. of $K_2SO_4$ in Water, g | 80 | 75 | 75 | 70 | 100 | 80 | 40 | 33.4 |
| $K_2SO_4/TiO_2$ (mole ratio) | 2.11 | 1.90 | 1.90 | 1.77 | 2.69 | 2.17 | 1.0 | 0.83 |
| Addition Time, minutes | 2 | 1 | 1 | 1 | 1 | 1 | 1 | 1 |
| Mixing Time, minutes | 15 | 60 | 60 | 60 | 60 | 15 | 60 | 60 |
| Amt. of $K_2SO_4$ Sat. Wash Water Used, ml | $10^3$ | $10^3$ | $10^3$ | $10^3$ | $10^3$ | $10^2$ | $10^3$ | $10^3$ |
| Yield of Titanium in Double Salt, percent | 87 | 85 | 87 | 95 | 88 | 86 | 92 | 86 |

From the above description and by the examples presented, it has clearly been shown that a double salt composition of titanium sulfate-potassium sulfate may be formed readily and directly by reacting a titanium sulfate solution with potassium sulfate. This double salt composition may be used directly to form a titania hydrate upon heating to 50–95° C. The titania hydrate forms readily without boiling and the yield of titania hydrate is substantially 100%. This titania hydrate is particularly useful as a yield seed in the hydrolysis of a titanium sulfate solution. It should be noted that this particular titania hydrate is useful as a yield seed and is new and novel since it was formed without the use of alkalizing agents and without boiling.

While this invention has been described and illustrated by the examples shown, it is not intended to be strictly limited thereto, and other variations and modifications may be employed within the scope of the following claims.

What is claimed is:
1. A process for producing a titania yield seed from a titanium sulfate-ferrous sulfate solution which comprises:
    (a) admixing said titanium sulfate-ferrous sulfate solution and an aqueous slurry of potassium sulfate to form a precipitate of titanium—potassium-sulfate double salt composition, said reaction carried out under agitation at temperature from 10° C. to 50° C., the amounts of the titanium sulfate-ferrous sulfate solution and the potassium sulfate employed being from 0.7 to 3.0 moles of potassium sulfate for each mole of titanium sulfate the concentration of the titanium sulfate-ferrous sulfate solution employed being from 20 to 300 g.p.l. titanium, calculated as $TiO_2$, and the concentration of the titanium values with respect to the total liquid present at the end of the reaction being from 15 to 200 g.p.l. titanium, calculated as $TiO_2$;
    (b) filtering said double salt;
    (c) washing said double salt with a saturated solution of $K_2SO_4$ to remove the soluble ferrous sulfate from said double salt;
    (d) slurrying the washed double salt in an aqueous media; and
    (e) heating and stirring said slurry to a temperature from 50° C. to no more than 95° C. to solubilize the potassium sulfate values and to hydrolyze the titanium values as a titania hydrate.

2. Process according to claim 1 in which the titanium sulfate-ferrous sulfate solution employed has an $$H_2O_4/TiO_2$$

mole ratio of 1.0 to 3.0.

3. Process according to claim 1 in which the hydrolysis of the titanium values is carried out at 75° C. to 90° C.

References Cited

UNITED STATES PATENTS

| 681,993 | 9/1901 | Spence | 23—202 X |
| 1,850,154 | 3/1932 | Raspe et al. | 23—117 |
| 2,744,028 | 5/1956 | Grave | 23—202 X |
| 3,037,685 | 10/1962 | Kamlet | 23—119 X |
| 3,071,439 | 1/1963 | Solomka | 23—202 |

OSCAR R. VERTIZ, *Primary Examiner.*

EDWARD STERN, *Examiner.*